May 6, 1958   S. R. PARKER ET AL   2,833,494
ROCKET EJECTION SYSTEM
Filed June 15, 1953   2 Sheets-Sheet 1

INVENTORS:
Stanley R. Parker
Carroll D. Phillips

By Herbert E. Metcalf
Their Patent Attorneys

INVENTORS:
Stanley R. Parker
Carroll D. Phillips
Their Patent Attorney

United States Patent Office 2,833,494
Patented May 6, 1958

2,833,494

ROCKET EJECTION SYSTEM

Stanley R. Parker, Tarzana, and Carroll D. Phillips, Los Angeles, Calif., assignors to Northrop Aircraft, Inc., Hawthorne, Calif., a corporation of California Application June 15, 1953, Serial No. 361,544

5 Claims. (Cl. 244—63)

This invention relates to means for ejecting "JATO" type rockets and more particularly to means for automatically ejecting "JATO" type rockets after they have expended their energy to augment the thrust of an aircraft to which they are attached in which pressure exerted by the rocket exhaust gas is utilized in the ejection operation.

Throughout this specification and the appended claims wherever the term "rocket" is used it is to be understood that a rocket of the general type commonly known as "JATO" is referred to unless otherwise indicated.

Rockets are frequently utilized to augment the thrust of many types of aircraft during their launching or take-off period thereby increasing their operational flexibility, this is particularly true of pilotless missiles and in the present disclosure the rocket ejection mechanism is disclosed as functioning to eject expended rockets from a missile of this type. Previously used launching equipment for missiles, e. g., track-sled launchers and the like, inherently possessed many disadvantages, they were extremely unwieldy requiring extensive transportation facilities and ideal terrain for their operation. The use of rockets directly attached to a missile eliminates to a great extent the disadvantages characteristic of previously used launching equipment of the type referred to above. Utilizing directly attached rockets during the launching of a missile permits it to be launched from a cradle or launcher of near zero length, such a launcher is usually extremely mobile and may usually be employed regardless of the type of terrain.

Rockets employed to provide a missile with additional thrust during its launching period are normally attached exteriorly of the body of the missile with their axes generally parallel with the longitudinal axis of the missile. To circumvent the necessity of a missile carrying a rocket casing after its propellant has expended itself, i. e., after it no longer provides forward thrust, the rocket casing is ejected. Due to the configuration of the missile and also the proximity of the rocket in relation to the missile to which it is attached, adequate provision must be made for the rocket's ejection so that it will not damage the missile or interfere with its forward progress in any way. It is also important that the rocket is ejected as quickly as possible after the rocket's propellent has expended itself in order that the missile will not be subject to unnecessary drag. Providing adequate means for releasably attaching and also means for ejecting a rocket free of a missile to which it is attached presents quite a problem. This problem is further complicated by the fact that the ejection mechanism must be fully automatic, no operator being available to actuate the ejection mechanism as would be the case if the rockets were used to augment the thrust of a conventional airplane.

Accordingly it is an object of the present invention to provide means for automatically ejecting an expended rocket which has been utilized to launch a missile or the like.

Another object is to provide means for automatically ejecting an expended rocket which has been utilized to launch a missile or the like in such a manner that its ejection will not damage the missile or in any way interfere with its forward progress.

Another object is to provide means for automatically ejecting an expended rocket which has been utilized to launch a missile or the like approximately at the same time that its propellent is expended.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

Figure 1:
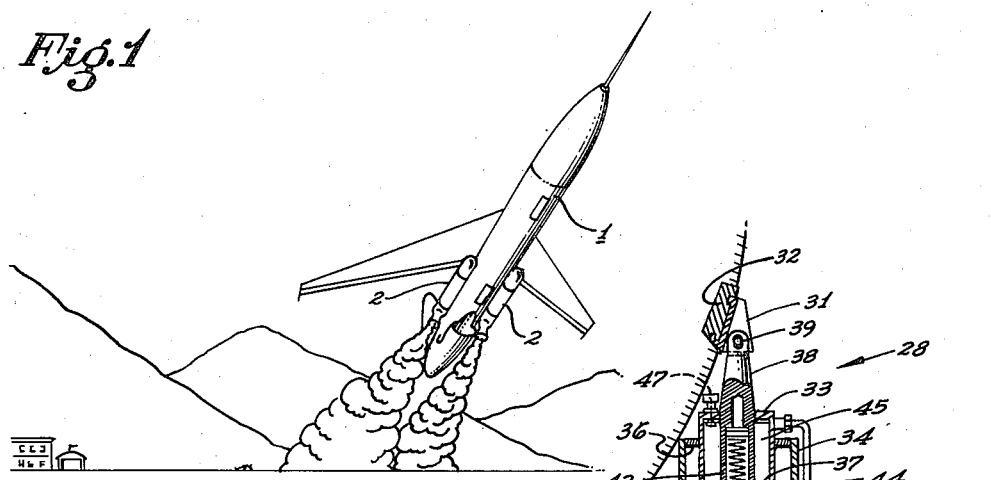
Figure 1 is a perspective view of a missile provided with two rockets functioning to augment the missile's thrust during its launching period, the automatic ejection mechanism of the present invention being utilized to eject the rockets after burnout.

Referring to the drawings for a detailed description of a preferred embodiment of the present invention, Figure 1 shows a pilotless missile 1 equipped with two rockets 2 utilizing a solid type of propellent. The rockets are attached on each side of the missile's fuselage near its center of gravity by means of fore and aft fittings 3 and 4, respectively, in a manner presently disclosed. The axes of the rockets are generally parallel with the longitudinal axis of the missile, however, they are adjusted so that the resultant thrust exerted by the rockets and the missile's power plant passes through the center of gravity of the combined mass of the loaded missile, rockets, and various mechanical devices for attachment and ejection. Although the above relationship is extremely important, in fact critical, the means and adjustments that make this relationship possible constitute no part of the present invention and accordingly are not described herein.

Inboard bearing loads resulting from the thrust created by rocket exhaust gases, also pitching components which may be present either under static conditions or during rocket burning, are transmitted to the missile's fuselage through a forward fitting 3 and an aft fitting 4. As both of these fittings are of the same general construction only the aft fitting will be described. The aft fitting 4, which to a great extent is of conventional construction frequently utilized in supporting an article of cylindrical configuration, includes a saddle 5 secured to the outer surface of the rocket by means of a strap 6. The saddle and strap encircle the rocket and are securely held in their relative position with respect to the rocket by means of a threaded end portion 7 of the strap and a nut 8, the threaded end portion extends through an aperture in a projecting portion 9 of the saddle while the other end of the strap is secured to the saddle by means of a pin 10. Projecting portions 11 of the saddle, located symmetrically at each side thereof, contact thrust fittings 12 which constitute structural members of the missile, inboard bearing loads mentioned above are transmitted to these fittings.

The rockets are secured to the missile at four positions adjacent each of the saddle projections 11 by means of four linkage assemblies 13. The linkage assemblies comprise a first link 14 generally of cylindrical configuration, this link passes through a bore in the saddle and projects on each side thereof, the axis of the bore and link being parallel with the longitudinal axis of the rocket. Attached to the projecting ends of link 14 are links 15 and 16 which are generally parallel with each other and the plane of the saddle which is perpendicular to the rocket's axis. These two links 15 and 16 extend beyond a top portion 17 of the saddle, extending between the end portions of these links is a cross link 18. Attached to link 18 at its mid-portion is another link 19, the end portion of this latter link, i. e., the end removed from link 18, is secured to a threaded plug 20 by means of a shear pin 21. Plug 20 is threadably secured in a fitting 22 which is fixedly secured to structural members of the missile adjacent thrust fittings 12. All links of the linkage assembly are pivotally secured to each other by means of hinge pins 23 with the exception of links 14 and 16, these latter links are secured by means of a threaded end portion on link 16 and nut 24, this latter connection provides means by which the rockets may be adjusted with respect to missile thrust fittings 12.

Rocket thrust is transmitted to the missile by means of a thrust fitting 25. This fitting is fixedly secured to the rocket at a position just aft of the forward fitting 3 and is provided with a surface 26 extending at right angles to the longitudinal axis of the rocket. Surface 26 contacts a mating surface on a thrust fitting 27 which constitutes a structural portion of the missile, the latter fitting absorbing thrust loads transmitted thereto by fitting 25.

The rockets are ejected by means of an ejection mechanism 28 located intermediate the fore and aft fittings 3 and 4. One end portion of the ejection mechanism is attached to the rocket by means of a fitting 29 provided with an arcuate surface which contacts the surface of the rocket, this fitting is maintained in its position with respect the rocket by means of a conventional strap 30. The other end portion of the ejection mechanism is releasably secured to the missile by means of a fitting 31, which contacts a mating portion of a fitting 32 fixedly secured to the missile.

The ejection mechanism 28 comprises a pair of coaxially arranged cylindrical members 33 and 34. The end of the outer cylinder 34, adjacent fitting 29, is rendered fluid tight by means of a circular plate 35 positioned therein, the end of inner cylinder 33 is open adjacent plate 35 and spaced slightly therefrom. The other end of cylinder 33 is rendered fluid tight and is fixedly secured to cylinder 34 by means of an annular member 36 which may be welded to both cylindrical members. A piston 37 and piston rod 38 are mounted within cylinder 33, the end of the piston rod extends a suitable distance beyond the end of cylinder 33 and is pivotally attached to fitting 31 by means of a hinge pin 39. The cylinder end of the ejection mechanism is attached to fitting 29 by means of a fitting 40 which extends in an axial direction from plate 35, this fitting enters a recess 41 in fitting 29 where it is so attached to provide a universal motion between fittings 29 and 40 and accordingly allows the same relative movement between the ejection mechanism 28 and rocket 2. Piston rod 38 is provided with a coaxial bore 42 adjacent its end to which the piston is attached. A preloaded helical spring 43 is positioned in bore 42 with its ends bearing against plate 35 and the end of bore 42. The spring 43 functions to maintain fitting 31 in its proper engaging position with fitting 32 until such time as the rocket is ejected. The piston 37 is rendered fluid tight with respect cylinder 33 by means of a conventional packing ring 44. The ejection mechanism is positioned, with respect to the missile and rocket, so that the extended axes of cylinders 33, 34 and piston rod 38 intersect the longitudinal axis of the rocket.

Figure 3:
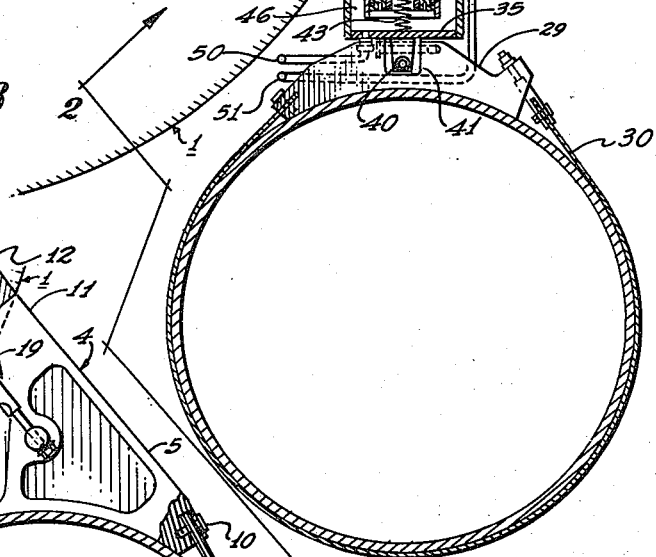
Figure 3 is a sectional view of the rocket and ejection mechanism shown in Figure 2, taken on the line 3—3 thereof.
Figure 4:
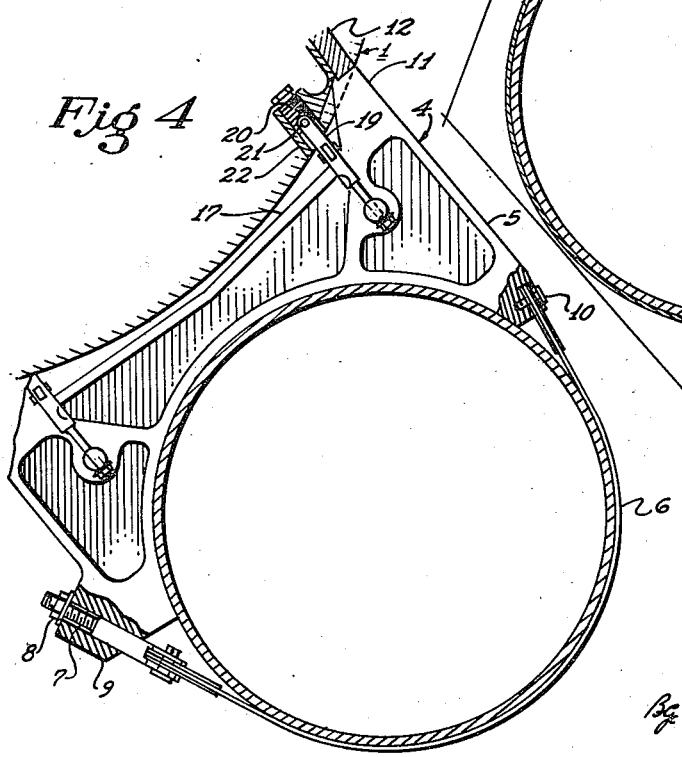
Figure 4 is a sectional view of the rocket and ejection mechanism shown in Figure 2, taken on the line 4—4 thereof.
Figure 2:
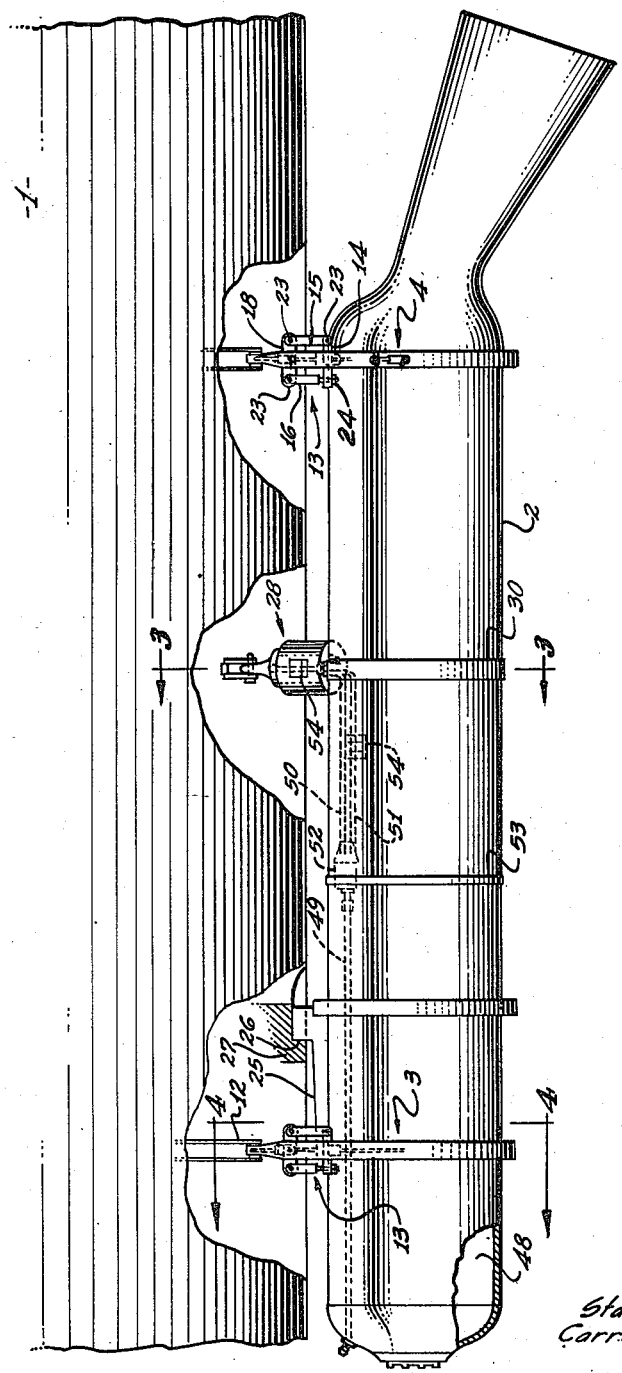
Figure 2 is a fragmentary side view (partly in section) of the missile shown in Figure 1, this view as seen from the line 2—2 of Figure 3 shows the relationship of the component parts of the ejection mechanism, rocket, and missile.

From the above description of the ejection mechanism it is seen two chambers 45 and 46 of variable volume are provided, in the particular embodiment disclosed the volume of chamber 46 is approximately twice that of chamber 45 with the piston 37 in the position shown in Figure 3, i. e., the position which it assumes prior to rocket firing. Chamber 45 is provided with a restricted orifice 47 which continually vents it to the atmosphere. Both chambers 45 and 46 are subjected to pressures present in combustion chamber 48 of the rockets during the firing period, gases therein being conducted to these chambers by means of fluid tight conduits 49, 50, and 51. Conduit 49 communicates with the combustion chamber 48 adjacent its closed end and with a manifold 52 secured to the rocket by means of a conventional strap 53, the manifold serves to divide gas flowing through conduit 49 to conduits 50 and 51. Conduit 50 provides a fluid passageway between manifold 52 and chamber 46 of the ejection mechanism while conduit 51 provides a similar passageway between the manifold and chamber 45. Positioned in each conduit 50 and 51 is a check valve 54 which permits gases having a pressure in excess of approximately 1400 p. s. i. to flow from the rocket combustion chamber 48 to chambers 45 and 46 but blocks gas flow in a reverse direction at pressures less than approximately 1400 p. s. i.

Having described the various component parts of the rocket ejection mechanism and attaching parts a better understanding of the mechanism will be forthcoming from the following in which the ejection of a rocket is described. Upon firing of the rockets the pressure in combustion chamber 48 rapidly increases, as this pressure reaches a predetermined amount e. g., approximately 1400 p. s. i., check valves 54 open allowing rocket exhaust gases to flow to chambers 45 and 46 subjecting them to gas pressures currently present in the rocket combustion chambers. If the pressure of semi-confined gas in chamber 45 is disregarded momentarily the axial force exerted by gas confined in chamber 46 is of sufficient magnitude to shear pins 21 and eject the rockets, this force being transmitted to the shear pins via fitting 29, the rockets, and fittings 3 and 4. At this particular time, however, the force exerted by gas in chamber 46 is opposed by an axial force due to semi-confined gas in chamber 45, the latter force is of less magnitude than the axial force resulting from confined gas in chamber 46. The resultant of these two opposing forces subjects pins 21 to a certain force, however, this force is not of sufficient magnitude to shear these pins. As the rockets expend their energy the pressure in their combustion chambers decreases accompanied by a flow of gas from chambers 45 and 46 toward combustion chambers 48. As the pressure in the system falls from 1400 p. s. i. check valves 54 close blocking further flow from chambers 45 and 46 via conduits 50 and 51. The pressure in chamber 46 remains at approximately 1400 p. s. i., however, gas continues to escape from chamber 45 through orifice 47 and accordingly the pressure in this chamber is reduced to a negligible amount shortly after the closing of valves 54. The axial force exerted by fluid pressure in chamber 46 is now unopposed and is of sufficient magnitude to shear the pins 21 as described above. Shear pins 21 located nearest to the vertical center line of the missile are the first to shear followed by the shearing of pins furtherest removed from the vertical center line of the missile. The force acting to shear pins 21 also imparts an outward movement to the rocket after the pins have been sheared, thus as the rocket falls under the influence of gravity it also moves outwardly with respect the missile in a manner in which it neither contacts or interferes with the forward progress of the missile. As the rockets are ejected relative angular movement of the rocket and ejection mechanism will occur, this relative movement is made possible by the universal type connection between fittings 29 and 40 without jamming or damage to any of the connecting parts. As piston 37 contacts the closed end of cylinder 33 fitting 31 is disengaged from fitting 32 allowing the ejection mechanism 28 to fall with the rocket. The missile thus freed of the expended rockets and ejection mechanism continues in flight propelled by its own thrust.

Thus it is seen the rockets are ejected momentarily after their propellent has expended its energy but not before, rocket ejection at this particular time is made possible by the specific construction and arrangement of the various parts of the ejection mechanism. In this respect pressure in chamber 45 is automatically reduced momentarily upon the closing of valves 54. The volume of chamber 45 is relatively small insuring a rapid pressure drop therein, the volume of chamber 46 is relatively large which provides a large volume of gas for expansion purposes, this insures relatively high pressures in this chamber notwithstanding expansion and consequently a force of relatively high magnitude for shearing pins 21. The area on which gas pressure in chamber 46 acts, in an axial direction, is relatively large which also contributes to the magnitude of the force acting to shear pins 21. These features combine to provide sufficient axial thrust to shear pins 21 and effect the rocket's ejection with minimum delay after rocket burnout.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. In combination: an aircraft, a rocket releasably attached to said aircraft in a manner augmenting the thrust of said aircraft when fired, and a rocket ejection mechanism, said rocket including a housing defining a combustion chamber containing an explosive charge which when fired produces fluid at varying pressures in said combustion chamber, said rocket ejection mechanism comprising a cylinder and mating piston defining a pair of variable volume chambers, conduits providing fluid passageways whereby said variable volume chambers are subjected to fluid pressure present in said combustion chamber prior to a predetermined time during the firing period of said rocket, means effective after said predetermined time to effect a difference between the fluid pressures present in said variable volume chambers which results in relative movement between said piston and cylinder, said cylinder and piston being attached to said rocket and aircraft, respectively, so that said relative movement between said piston and cylinder exerts a force on said rocket to effect the ejection of the latter from said aircraft.

2. The combination as set forth in claim 1, in which said last mentioned means comprises check valves positioned in said conduits and an aperture venting one of said variable volume chambers to the atmosphere.

3. In combination: an aircraft, a rocket releasably attached to said aircraft in a manner augmenting the thrust of said aircraft when fired, and a rocket ejection mechanism, said rocket having a combustion chamber subject to varying fluid pressures during its firing period, said rocket ejection mechanism comprising a cylinder, a mating piston and piston rod mounted in said cylinder defining first and second variable volume chambers, said first chamber defined by said cylinder and piston adjacent said piston rod, said second chamber defined by said cylinder and piston removed from said piston rod, said piston rod attached to said aircraft, said cylinder attached to said rocket, conduits providing fluid passageways whereby said first and second chambers are subject to fluid pressures present in said combustion chamber prior to a predetermined time during the firing of said rocket, means including check valves in said conduits and wall portions of said cylinder defining an aperture providing fluid communication between said first chamber and ambient atmosphere effective after said predetermined time to effect a reduction in fluid pressure in said first chamber resulting in a movement of said cylinder relative to said piston and the ejection of said rocket from said aircraft.

4. The combination as set forth in claim 3, in which the volume of said second chamber exceeds that of said first chamber.

5. In combination: an aircraft; a rocket including a housing defining a combustion chamber containing an explosive charge which when fired produces a fluid at varying pressures in said combustion chamber and said rocket being releasably attached to said aircraft in a manner to augment the thrust of said aircraft; and a rocket ejection mechanism including a pair of cylindrical housings of different diameters having an axial aligned and overlapping relation and a piston and piston rod combination operationally mounted in the housing of smaller diameter to define a pair of variable volume chambers; conduits extending between said combustion and variable volume chambers to provide fluid communication therebetween; valve means in said conduits allowing fluid flow from said combustion chamber to said variable volume chambers during a predetermined interval of the firing period of said rocket and blocking fluid flow through said conduits before and after said predetermined interval; wall portions of said housing having the smaller diameter defining an aperture continuously venting the variable volume chamber defined by the housing of smaller diameter and piston and piston rod combination to the atmosphere; said valve means and aperture acting after said predetermined interval to effect a difference in fluid pressure in said variable volume chambers resulting in relative movement between said piston and piston rod combination and said cylinder; and said cylinder and piston rod being attached to said rocket and aircraft, respectively, so that said relative movement results in a force exerted on said rocket to eject the latter from said aircraft.

References Cited in the file of this patent

UNITED STATES PATENTS

| 810,261 | Cantelou | Jan. 16, 1906 |
| 1,621,654 | Boos | Mar. 22, 1927 |
| 2,317,383 | Hull | Apr. 27, 1943 |
| 2,421,807 | Richey et al. | June 10, 1947 |
| 2,726,576 | Musser | Dec. 13, 1955 |

FOREIGN PATENTS

| 585,564 | Great Britain | Feb. 11, 1947 |